(12) United States Patent
Gatica et al.

(10) Patent No.: US 9,527,021 B2
(45) Date of Patent: Dec. 27, 2016

(54) FILTER MANIFOLD

(71) Applicant: Pall Corporation, Port Washington, NY (US)

(72) Inventors: Anthony William Gatica, Cedar Park, TX (US); Brian Anthony Palermo, Dryden, NY (US); Mark William Foohey, Austin, TX (US)

(73) Assignee: Pall Corporation, Port Washington, NY (US)

( * ) Notice: Subject to any disclaimer, the term of this patent is extended or adjusted under 35 U.S.C. 154(b) by 210 days.

(21) Appl. No.: 14/068,572

(22) Filed: Oct. 31, 2013

(65) Prior Publication Data
US 2015/0113925 A1  Apr. 30, 2015

(51) Int. Cl.
*B01D 35/30* (2006.01)
*B01D 46/42* (2006.01)

(52) U.S. Cl.
CPC .......... *B01D 35/30* (2013.01); *B01D 46/4227* (2013.01); *B01D 2201/24* (2013.01); *B01D 2201/303* (2013.01); *B01D 2201/4023* (2013.01)

(58) Field of Classification Search
CPC . B01D 35/30; B01D 46/4227; B01D 2201/24; B01D 2201/303; B01D 2201/4023
See application file for complete search history.

(56) References Cited

U.S. PATENT DOCUMENTS

| | | | | |
|---|---|---|---|---|
| 3,399,776 A | * | 9/1968 | Knuth | B01D 29/114 210/234 |
| 4,172,580 A | * | 10/1979 | Raftis | F16K 7/06 251/7 |
| 4,806,240 A | * | 2/1989 | Giordano | B01D 27/08 206/831 |
| 4,904,382 A | * | 2/1990 | Thomsen | B01D 35/153 210/236 |
| 5,925,245 A | * | 7/1999 | Bradford | B01D 35/30 210/232 |
| 6,068,770 A | * | 5/2000 | Niermeyer | B01D 35/26 210/321.6 |
| 6,120,685 A | * | 9/2000 | Carlson | B01D 35/143 210/232 |
| 6,139,738 A | * | 10/2000 | Maxwell | B01D 29/15 210/248 |
| D513,304 S | | 12/2005 | Suzuki | |
| 7,021,667 B2 | | 4/2006 | Campbell et al. | |
| 7,338,599 B2 | | 3/2008 | Hiranga et al. | |
| 7,469,932 B2 | | 12/2008 | Niermeyer et al. | |
| 8,069,991 B2 | | 12/2011 | Norris et al. | |
| 2004/0182777 A1 | | 9/2004 | Stankowski et al. | |
| 2011/0211976 A1 | | 9/2011 | Magoon et al. | |
| 2011/0247974 A1 | | 10/2011 | Gale et al. | |
| 2013/0031926 A1 | | 2/2013 | Huda et al. | |

FOREIGN PATENT DOCUMENTS

| | | |
|---|---|---|
| JP | 2009/018308 A2 | 1/2009 |
| JP | 2009/502453 A | 1/2009 |
| JP | 2012/501832 A | 1/2012 |
| WO | WO 2007/012079 A2 | 1/2007 |

* cited by examiner

*Primary Examiner* — Amber R Orlando
*Assistant Examiner* — Britanny Precht
(74) *Attorney, Agent, or Firm* — Leydig, Voit & Mayer, Ltd

(57) ABSTRACT

A filter manifold is provided for filtering particulates in fluid and gas streams. The filter manifold seals the inlet and outlet valves in a closed position until a filter capsule is loaded into a carriage assembly. The inlet and outlet valves are opened only when a filter capsule is properly loaded into the carriage assembly.

30 Claims, 12 Drawing Sheets

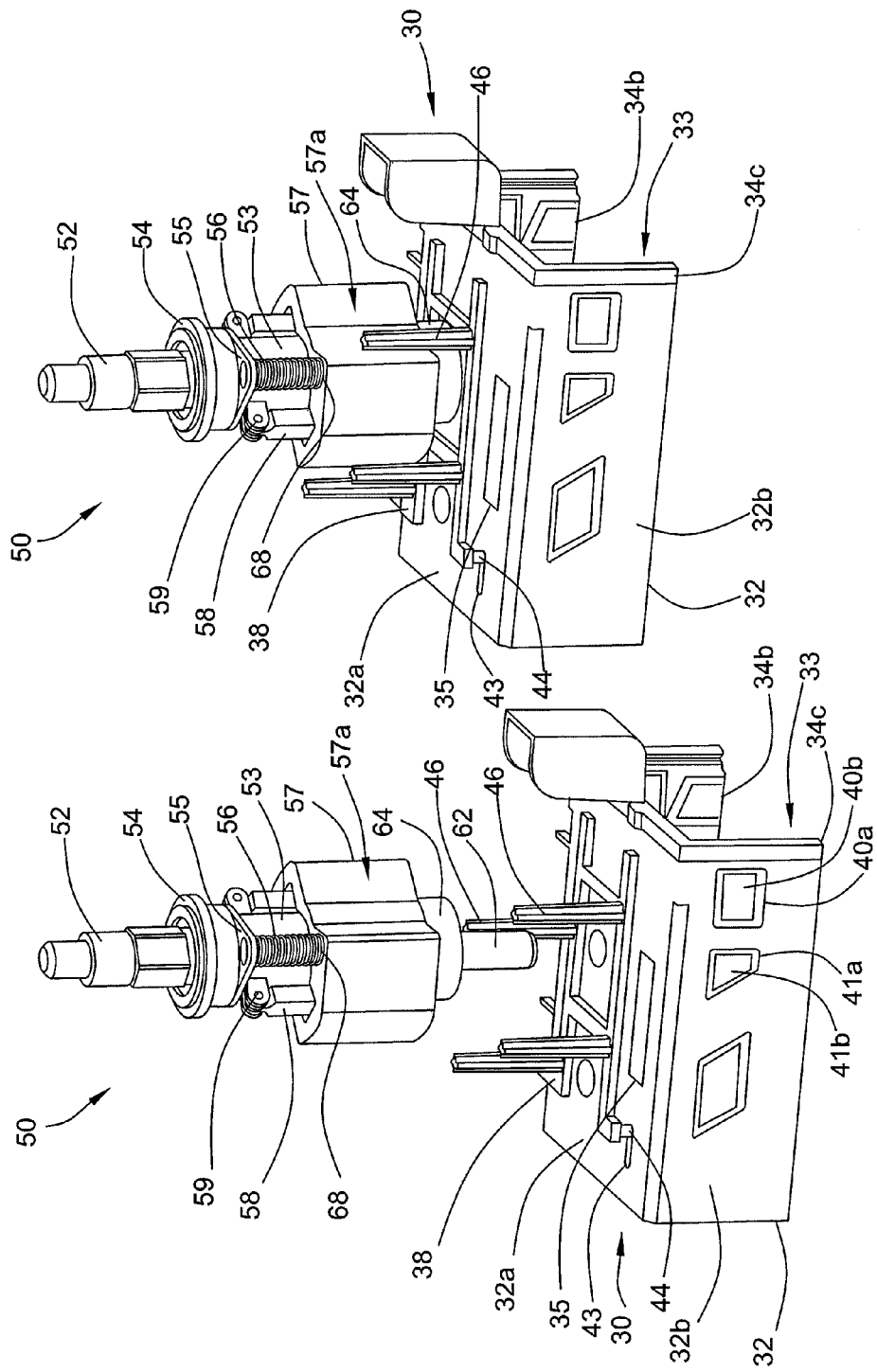

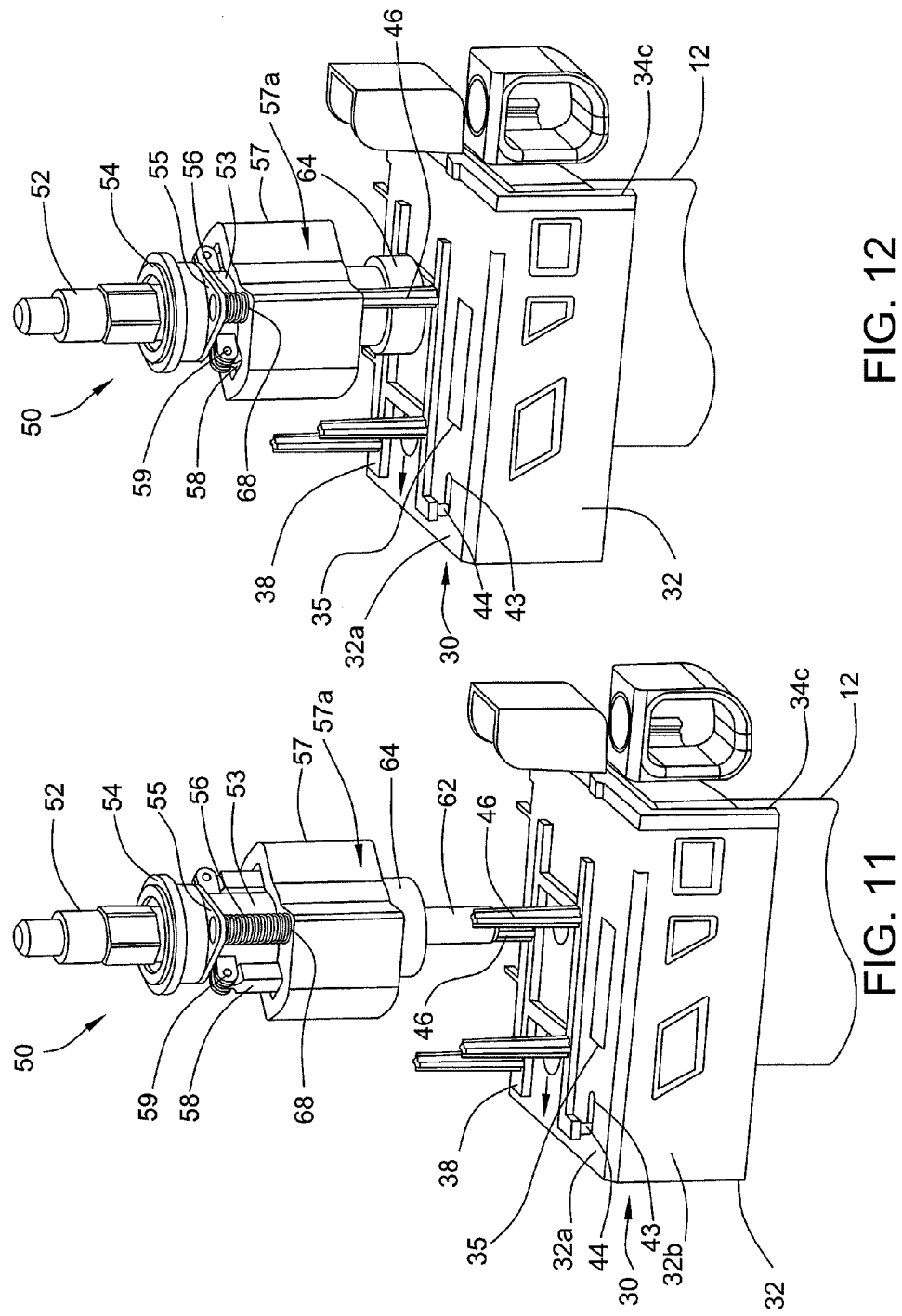

FILTER MANIFOLD

TECHNICAL FIELD

This invention relates to filter manifolds and, more particularly, to manifolds for holding cylindrical filter capsules.

BACKGROUND

Filter capsules have a cylindrical filter element for filtering undesirable substances from fluid and gas streams. The undesirable substances may include solid or colloidal particulates, gels, and gas bubbles. Filter capsules have at least inlet and outlet ports and a housing for directing the stream between the inlet and outlet ports. Filter capsules also have a filter medium disposed between the inlet and outlet ports, which filters the undesirable substances in the stream.

A manifold may be used to introduce the fluid/gas stream to be filtered into the filter capsule and extract the clean stream from the filter capsule. The manifold may supply the substance-laden stream to the filter via the inlet port, and may extract the filtered stream, or filtrate, via the outlet port. The filter must be mounted in the manifold so that feed and filtrate fittings may be sealingly attached to the filter capsule's inlet and outlet ports, respectively. In many manifolds, the filter capsule is mounted to the manifold using a male fitting which may be manually screwed into a corresponding female fitting in the manifold. Similarly, when the useful life of the filter capsule has expired because, for example, the filter medium is clogged with the undesirable substances removed from the stream, the filter capsule must be removed from the manifold by manually untwisting the filter capsule's fitting from the corresponding fitting. Similarly, the manifold's multiple fittings must also be manually attached to the filter capsule's inlet and outlet ports, and then manually opened or closed to permit the filter capsule to process the stream.

This type of manifold has many disadvantages. Since manifolds may hold multiple filter capsules, installing and removing multiple capsules may be a time consuming and intricate, manually dexterous process. It may be difficult to confirm when the filter capsule is properly seated in the manifold and insure a proper fluid-tight seal between the capsule and manifold. Similarly, it may also be difficult to insure that the filter capsule is present and properly seated before the feed and extract fittings are opened to introduce the stream into the capsule. This is particularly important for many fluids which are toxic or corrosive, and when handling the capsule filled with the fluid may be hazardous.

SUMMARY OF THE INVENTION

In accordance the present invention, a filter manifold system is provided which permits a filter capsule to be quickly and easily loaded and which permits the user to open the manifold when the filter capsule is properly seated in the manifold, thus insuring a proper fluid-tight seal between the capsule and manifold. The filter manifold comprises a filter capsule for filtering a substance-laden stream, a housing, and a carriage assembly disposed in the housing.

The carriage assembly comprises a filter tray for receiving and holding the filter capsule. A lifting arm operatively engages the filter tray for moving the filter tray between an initial loading position and a final position. A valve actuator operatively engages the filter tray for activating the inlet and outlet valves such that the valve actuator moves between an inactive position in which the valve actuator does not open the inlet and outlet valves and an activated position in which the valve actuator opens the inlet and outlet valves in response to insertion of the filter capsule into the filter tray.

The filter manifold further comprises a lifting assembly. The lifting assembly has a handle rotatably mounted on the housing to move between the initial or open position and an activated final or closed position. The handle is operatively connected to the lifting arm so that the lifting arm moves between the open and closed positions in response to movement of the handle. The lifting arm is disposed in the initial loading position so that the filter tray may receive the filter capsule when the handle is in the initial position. The lifting arm and valve actuator are lifted to the activated position in response to movement of the handle to the activated position.

The filter manifold system further comprises an inlet valve for delivering the stream to the filter capsule and an outlet valve for delivering the stream from the filter capsule disposed in the housing. The inlet and outlet valves have pinch arms which move between a closed position preventing the stream from passing through the valve and an open position permitting the stream to pass through the inlet and outlet valves so that the inlet and outlet valves are in fluid communication with the filter capsule. The pinch arms move to the open position and open the inlet and outlet valves when the valve actuator is in the activated position and the handle is in the activated position.

In a preferred embodiment, the filter manifold system comprises a valve actuator having a base, an actuator spring which biases the valve actuator toward the inactive position, and at least one downwardly projecting pin attached to the base. The pin is disposed so that it projects into the path of the filter capsule when the filter capsule is inserted into the filter tray and permits the filter capsule to move the valve actuator to the activated position. The valve actuator may further comprise a plurality of upstanding legs attached to the base and disposed below the inlet and outlet valves. The legs are disposed so that the legs engage the valve and cause the pinch valve to move to the open position when the valve actuator is in the activated position and the filter tray is in the final position. The legs do not engage the valve and the valve remains in the closed position when the valve actuator is in the inactive position and the filter tray is in the final position.

The valve preferably comprises a wedge sleeve which moves between an upper open position and a lower closed position. The wedge sleeve has a first hole which slidably receives the pinch arms and a tapered wall which slidably engages the pinch arms in response to movement between the upper open position and the lower closed position. The tapered wall causes the pinch arms to move to the closed position so that the valve is closed when the wedge sleeve is in the lower closed position. The tapered wall in the wedge sleeve permits the pinch arms to move to the open position when the wedge sleeve is in the upper open position.

In yet another embodiment, the valve may comprise a spring operatively engaging the wedge sleeve to bias the wedge sleeve toward the lower closed position. Thus, the plurality of upstanding legs attached to the base and disposed below the inlet and outlet valves are preferably disposed so that the legs engage the wedge sleeve and push the wedge sleeve to the upper open position. In this position, the pinch arms are able to move to the open position when the valve actuator is in the activated position and the filter tray is in the final position. The legs also are disposed so that the legs do not engage the wedge sleeve and the wedge sleeve remains in the lower closed position when the valve actuator is in the inactive position and the filter tray is in the final position.

The valve may preferably comprise a flexible sealing tube disposed between the pinch arms so that the tube is open when the pinch arms are in the open position and the pinch arms push against the sealing tube in the closed position to seal the walls of the tube against each other and close the valve.

BRIEF DESCRIPTION OF THE DRAWINGS

The preferred embodiments of the present invention are explained in greater detail with reference to the following drawings. While various illustrative embodiments of the present invention are shown in the following drawings, the drawings should not be used to limit the scope of the present invention.

FIGS. 9-10 are perspective/schematic views showing one of the valve assemblies and the carriage assembly (without a filter capsule) moving from the initial or lower position to the upper or active position, respectively, wherein the valve remains in the closed position.

FIGS. 11-12 are perspective/schematic views showing one of the valve assemblies and the carriage assembly (with a filter capsule) moving from the initial or lower position to the upper or active position, respectively, wherein the valve assembly is in the open position.

DETAILED DESCRIPTION OF PREFERRED EMBODIMENTS

It will be appreciated that this detailed description provides exemplary embodiments of the invention. Since other embodiments of the invention may differ in detail from the embodiments in this detailed description, the detailed description is intended to reference the particular embodiments being discussed at that point and is not intended to imply any limitation as to the scope of the invention more generally.

Figure 1:
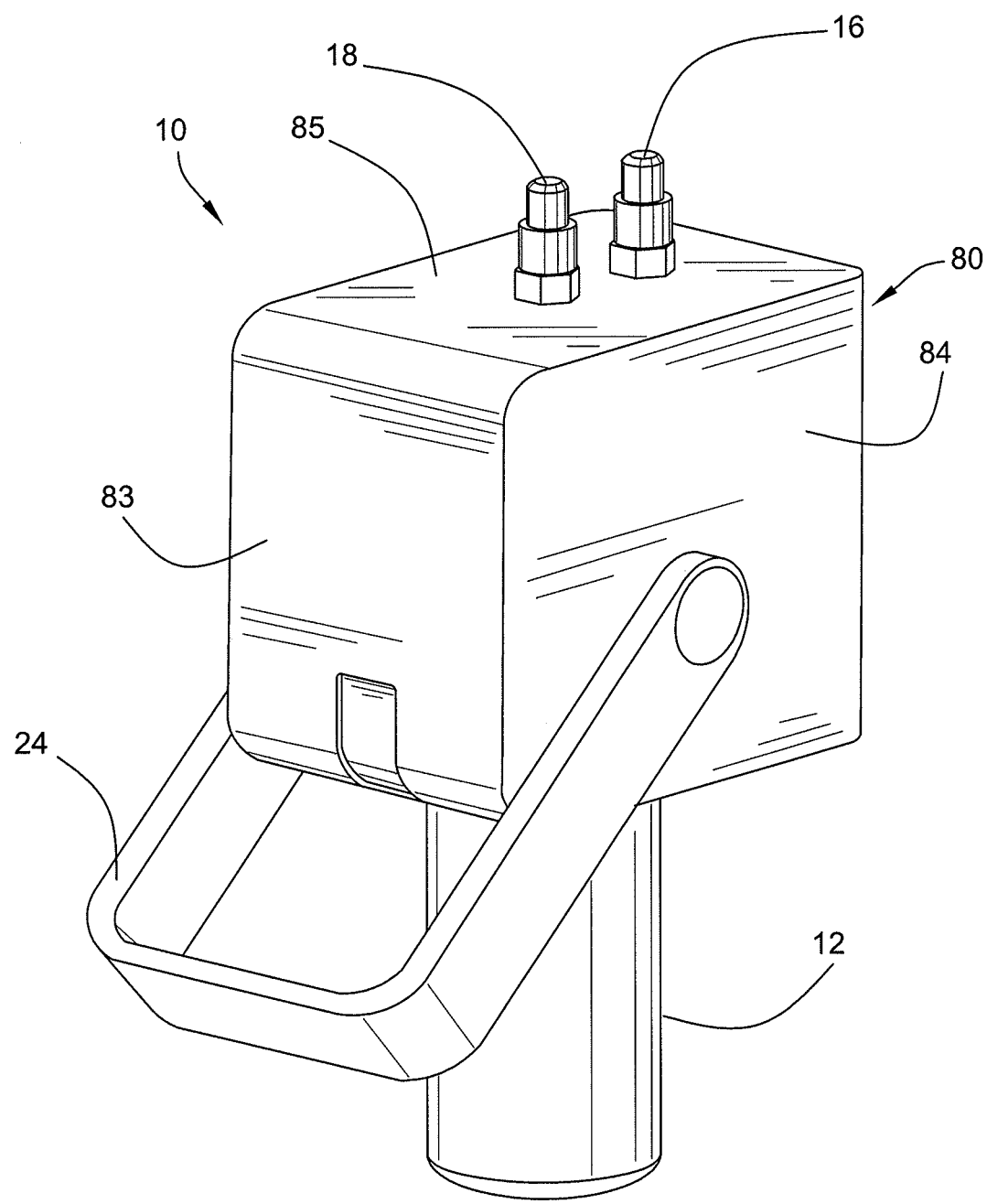
FIG. 1 is a perspective view of one embodiment of a manifold and filter capsule.

FIG. 1 illustrates a manifold 10 for receiving and holding a filter capsule 12, and then creating a fluid-tight seal with the filter capsule 12 so that a fluid or gas stream may be introduced into and extracted out of the filter capsule 12. During normal operation, the internal components of the manifold 10 are normally covered by an exterior housing 80, including front plate 83, two side plates 84, top plate 85 and rear plate 86. For ease of reference, the housing 80 has been removed in many of the drawings to facilitate illustration of the invention. The manifold has at least one valve but preferably has inlet and outlet valves 16, 18 which permit fluid communication between a fluid source (not shown) and the filter capsule 12.

Figure 2:
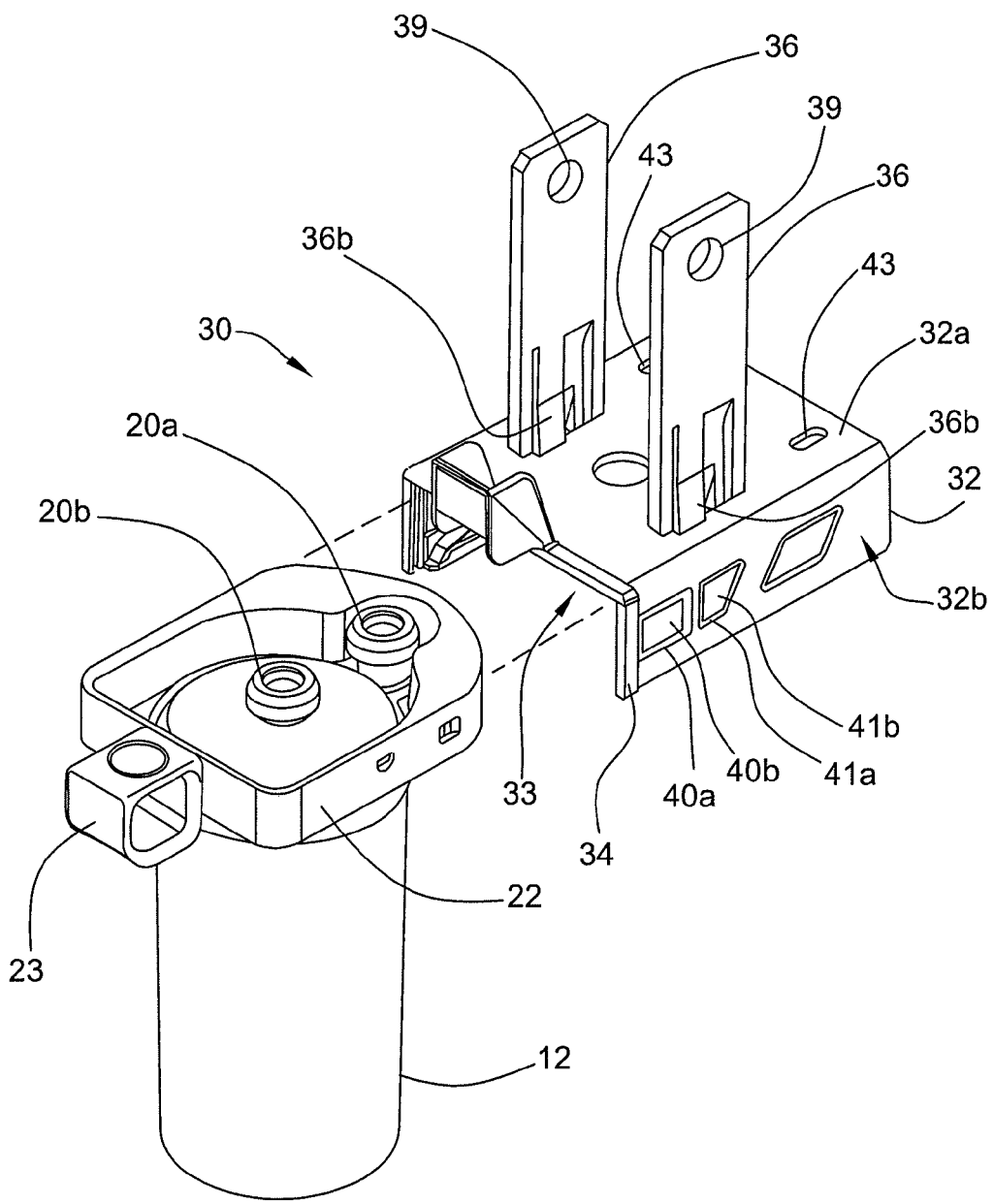
FIG. 2 is a perspective view of the filter capsule and carriage assembly.

As best shown in FIG. 2, the filter capsule 12 has a generally cylindrical configuration. Filter capsules 12 preferably have at least inlet and outlet ports 20a, 20b, and a housing for directing the stream between the inlet and outlet ports 20a, 20b. The inlet port 20a receives the particulate-laden stream and the outlet port 20b delivers clean particulate-free filtrate after the filtration process. A filter medium (not shown) disposed between the inlet and outlet ports 20a, 20b filters out undesirable substances in the stream including, for example, solid or colloidal particulates, gels, and gas bubbles.

The manifold 10 has a carriage assembly 30 for receiving and holding the filter capsule 12. The carriage assembly 30 moves in a generally vertical direction between: (1) a lower or initial position shown in FIG. 14, (2) an intermediate position shown in FIG. 15, and (3) an upper or final position in FIGS. 1 and 16. When the carriage assembly 30 is in the lower position, the filter capsule 12 may be releasably inserted into and out of the carriage assembly 30 as best shown in FIG. 2. FIG. 2 illustrates a removable collar 22 disposed around the top of the capsule 12 which facilitates insertion of the filter capsule 12 into the carriage assembly 30. The collar 22 has a finger tab 23 which also facilitates manipulation of the filter capsule 12. The filter capsule 12 is shown in phantom lines in FIGS. 14-16.

The manifold 10 has a handle 24. When the handle 24 is rotated between (1) the initial or open position in FIG. 14, (2) the intermediate position in FIG. 15, and (3) the final or closed position in FIGS. 1 and 16, the handle 24 raises carriage assembly 30 and filter capsule 12 from the lower position (FIG. 14) into the upper position (FIG. 16). During normal filtration operation, the manifold's inlet and outlet valves 16, 18 only may be opened when the filter capsule 12 is properly loaded in the manifold, and the manifold's valves 16, 18 are properly seated in the filter's inlet and outlet ports 20a, 20b in a fluid-tight manner.

Figure 8:
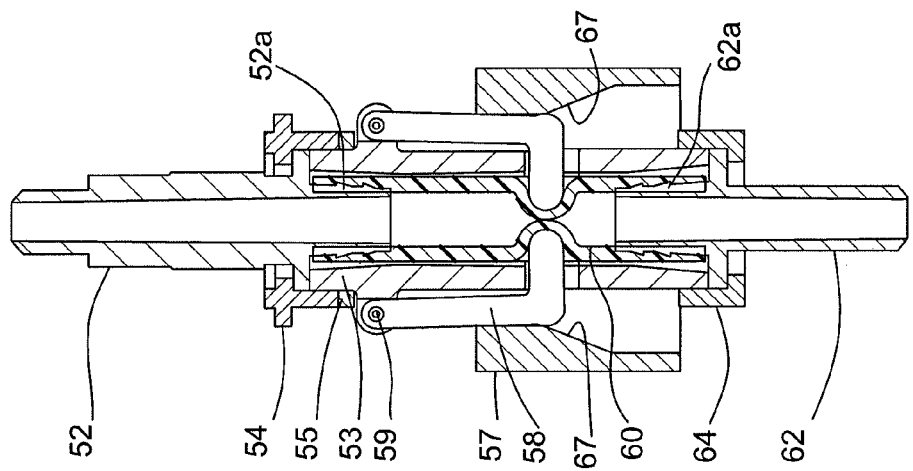
FIG. 8 is a cross-sectional view of one of the valve assemblies taken along line 8-8 in FIG. 4 showing the valve in the closed position.
Figure 6:
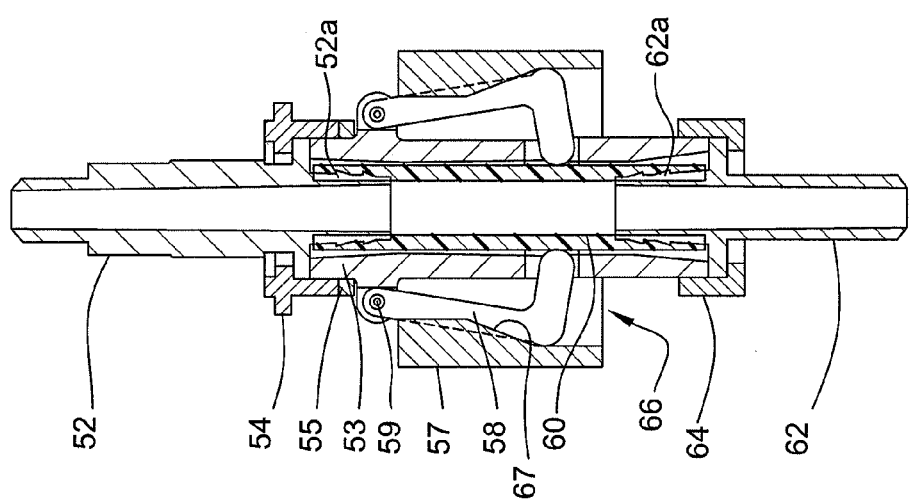
FIG. 6 is a cross-sectional view of one of the valve assemblies taken along line 6-6 in FIG. 5 showing the valve in the open position.

Preferred embodiments of the manifold's valves 16, 18 are illustrated in greater detail in FIGS. 4-12. It will be appreciated that the manifold uses at least one valve. In the illustrated embodiment, the manifold uses two valves but, since both valves operate in the same manner, some of the figures have been simplified to show only one valve. Each valve 50 has open and closed positions. In the open position, fluid may pass through the valve 50. In the closed position, the valve 50 forms a closed, fluid-tight seal which prevents fluid from passing through the valve 50 until the valves 16, 18 are properly seated against the filter capsule's ports 20a, 20b. FIGS. 8 and 9 illustrate when the carriage assembly 30 is in the lower position and the valves are not seated against the filter capsule 12, so that the valves are disposed in the closed position and form a closed, fluid-tight seal. FIGS. 6 and 12 illustrate when both the carriage assembly 30 and the filter capsule 12 are raised to the upper position so that the valves 16, 18 may be properly seated against the filter's ports 20*a*, 20*b*. In this position, the valve 50 moves into the open position in response to a valve actuator 38 disposed on the carriage assembly 30.

Figure 3:
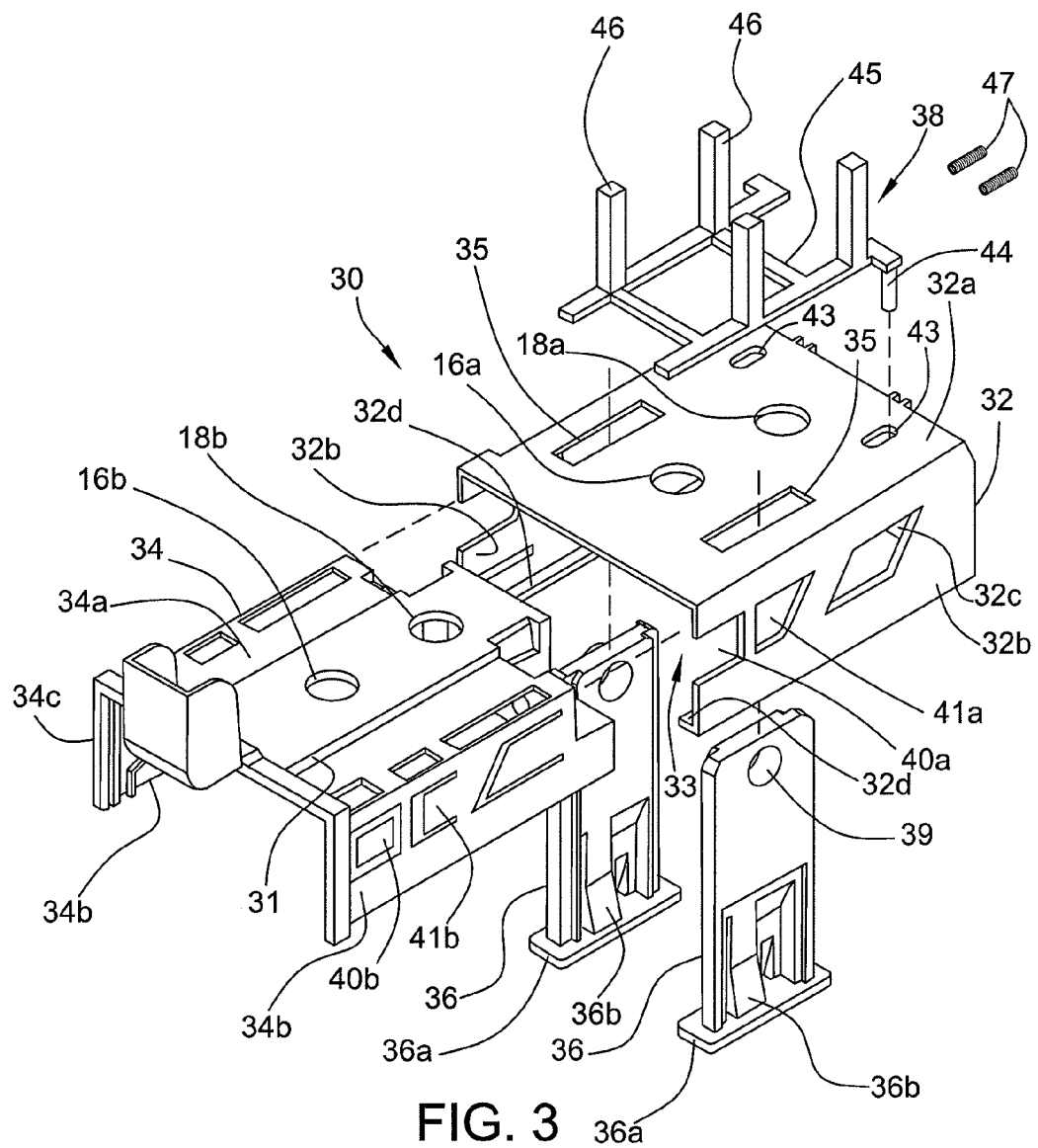
FIG. 3 is an exploded view of the carriage assembly.
Figure 4:
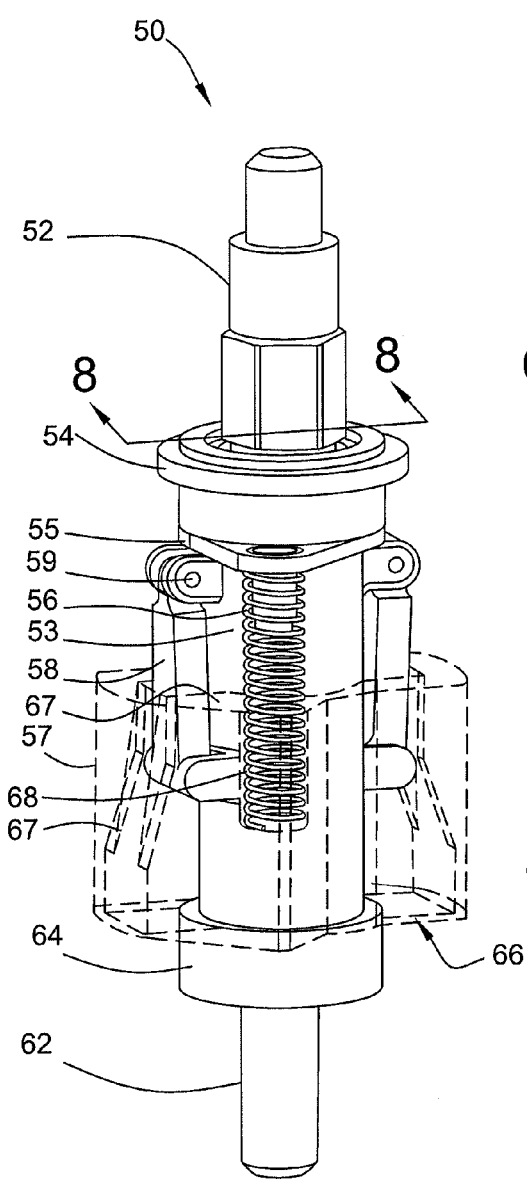
FIG. 4 is a perspective view of one of the valve assemblies in the closed position, which prevents fluid from passing through the valve.
Figure 5:
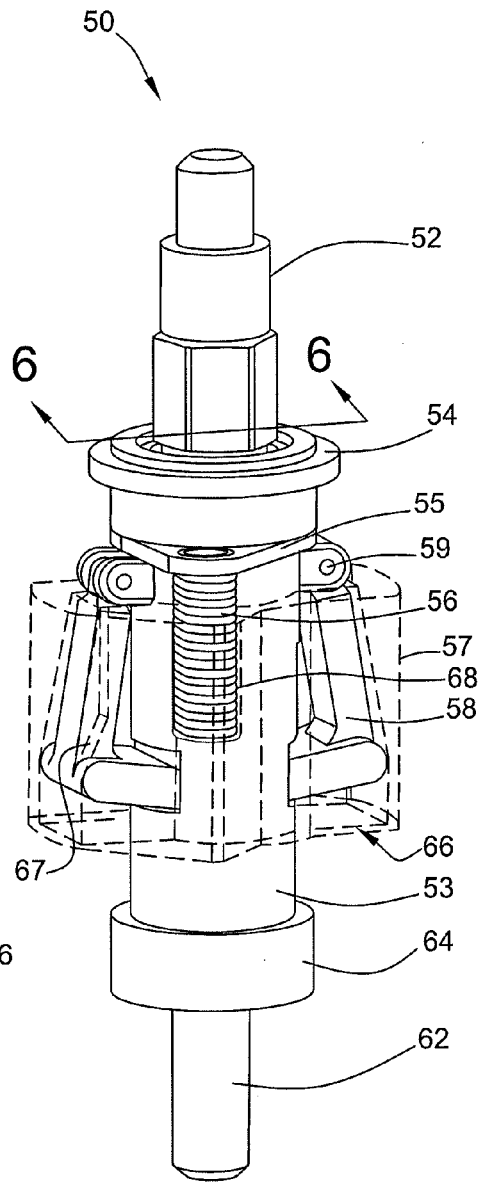
FIG. 5 is a perspective view of one of the valve assemblies in the open position, which permits fluid to pass through the valve.

Referring to the exploded view of a preferred embodiment of the carriage assembly 30 in FIG. 3, the carriage assembly 30 comprises a main shuttle 32, a filter tray 34, two upstanding lifting arms 36, and valve actuator 38. The main shuttle 32 has a generally horizontal main body 32*a*, two depending sides 32*b*, and a depending back wall 32*c*. The depending sides 32*b* have small lips 32*d* which project inwardly toward each other. The main body 32*a*, depending sides 32*b* and lips 32*d* form a channel 33 adapted to slidably receive the filter tray 34 as best shown in FIG. 3. The main shuttle sides 32*b* may have one or more slots and openings to help align and hold the filter tray 34 in the main shuttle 32. In a preferred embodiment, the sides 32*b* have a slot 40*a* and holding slot 41*a*. The holding slot 41*a* cooperates with a detent (labeled 40*b*/41*b* in the figures) on the filter tray 34 to secure the filter tray 34 to the shuttle 32. The slot 40*a* provides clearance for a user's finger to compress the detent 40*b*/41*b*.

In a preferred embodiment, the filter tray 34 has a body 34*a* and two depending sides 34*b*. The filter tray sides 34*b* have at least one detent 40*b*/41*b* which cooperates with the slots 40*a*, 41*a* in the main shuttle 32. The detent 40*b*/41*b* is preferably formed as a flexible part of the tray sides 34*b*. The detent, which is biased outwardly, is adapted to flex inwardly when it engages the main bracket side 32*b* so that it does not interfere with the insertion of the filter tray 34 into the main shuttle 32. When the detent 41*b* clears the walls, it biases outwardly and is adapted to closely fit inside the holding slot 41*a*, and thus hold the filter tray 34 in the main shuttle 32. It will be appreciated that the filter tray 34 may be removed from the main shuttle 32 by pressing the detent 40*b* inwardly so that the detent 41*b* clears the slot 41*a*, and then slidably withdraws the tray 34 out of the shuttle 32.

The main shuttle 32 has a plurality of slots or holes 35 which permit the two upstanding arms 36 to be inserted into the slots 35 from the channel. The tops of the arms 36 also have at least one hole 39 which may be releasably attached to the lifting mechanism. The arms 36 have a bottom rim 36*a* which is slightly wider than the slots 35 and prevents the arms 36 from passing through the slots 35. The arms 36 may have a flexible, tapered portion 36*b* which deflects slightly as it passes through the bracket slot 35. Once through the slot 35, the tapered portion 36*b* expands to create a snap-fit to the shuttle body 32*a*. It will be appreciated that, after the arms 36 are inserted into the slot 35 and the filter tray 34 is slidably inserted into the main shuttle 32, the arms 36 are trapped between the shuttle body 32*a* and the filter tray body 34*a*. Consequently, pushing and/or pulling on the arms 36 will cause the carriage assembly 30 and filter capsule 12 to move in the vertical direction. It will also be appreciated that the carriage assembly 30 may be raised and lowered in response to the lifting mechanism which raises and lowers the two upstanding arms 36. To facilitate assembly, the filter tray body 34*a* forms a ledge 31 which provides clearance for the arm's rim 36*a* when the filter tray 34 is inserted into the main shuttle 32.

The main shuttle 32 also has at least one actuator slot 43, and preferably two slots 43, to receive the valve actuator 38 and permits the valve actuator 38 to move between inactive and activated positions. The valve actuator 38 preferably has a generally H-shaped base 45 formed by two sets of parallel bars, two sets of upstanding parallel legs 46, and at least one pin 44, and preferably two pins 44, projecting downwardly through the actuator slots 43. In the inactive position, actuator springs 47, disposed in the carriage assembly 30, bias the valve actuator 38 outwardly toward the opening of the main bracket channel (i.e., to the left in FIG. 3). In the activated position, the filter capsule 12 overcomes the bias of the springs 47 and pushes the pins 44 toward the bracket back wall (i.e., to the right in FIG. 3) as the filter capsule 12 is slidably inserted into the carriage assembly 30. As the filter 12 pushes the pins 44, the entire valve actuator 38, including the upstanding legs 46, is moved into the activated position. When the filter 12 is removed from the carriage assembly, the springs 47 push the pins 44 toward the channel opening 33, thereby moving the valve actuator 38 from the activated to the inactive position. It will be appreciated that, in a preferred embodiment of the invention, the valve actuator is only in the activated position when a filter capsule is loaded into the carriage assembly.

The main shuttle 32 has holes 16*a*, 18*a* and the filter tray 34 has holes 16*b*, 18*b* which correspond to valves 16, 18, respectively, and permit the valves 16, 18 to pass through the carriage assembly 30 to form a fluid tight seal with the filter 12. It will be appreciated that these holes are disposed so they will not be obstructed as the valve actuator 38 moves between the inactive and activated positions.

The valves 16, 18, shown in greater detail in FIGS. 4-12, may be connected to the source of the fluid/gas stream that is to be filtered. The manifold 10 has at least one valve 50, and preferably inlet and outlet valves 16, 18. In other embodiments, a third valve may also be used to vent air in the filter capsule 12. The valves 50 have a fitting 52 disposed in a valve housing 53, and an upper port cap 54 and spring plate 55. The valve housing 53 has male threads on its upper and lower portions. The port cap 54 has female threads which cooperate with the male threads on the upper portion of the valve housing 53 to form a fluid tight seal. The valve fitting 52 and spring plate 55 are disposed and held between the housing 53 and port cap 54.

The valves have a spring 56 disposed between the spring plate 55 and wedge sleeve 57. The valve housing 53, which is slightly wider than the spring plate 55, anchors one side of the spring plate 55 so that the spring 56 may bias the wedge sleeve 57 away from the spring plate 55, which is downward in FIGS. 4-12. Pinch arms 58 are attached to the valve housing 53 so that they may pivot about spring pins 59 between an open position shown in FIG. 6, an intermediate position shown in FIG. 7, and a closed position shown in FIG. 8.

The valves have a sealing tube 60 which may be opened and closed by the pinch arms 58. Since the sealing tube 60 is pinched closed by the arms 58, the tube 60 is preferably made of a high resilience polymeric material. One end of the sealing tube 60 may be attached in a press-fit fashion to a plurality of barbs, teeth or grooves 52*a* at the end of the valve fitting 52. A capsule port 62 may also be attached in a press-fit fashion to the other end of the sealing tube 60 using a plurality of barbs, teeth or grooves 62*a*. The barbed ends of the valve fitting 52 and capsule port 62 are preferably tapered to facilitate compression of the sealing tube 60 between the valve fitting 52 and capsule port 62 and valve housing 53. The capsule port 62 is disposed at the bottom of the valve system so that the capsule port 62 may releasably engage the inlet and outlet ports 20*a*, 20*b* in the filter capsule. The capsule port 62 is secured to the valve housing 53 using a lower port cap 64. The port cap 64 has female threads which cooperate with the male threads on the lower portion of the valve housing 53. A fluid tight seal is formed between the sealing tube 60 and capsule port 62. As best shown in FIGS. 9-10, the valve fitting 52, sealing tube 60 and capsule port 62 form a fluid-tight path which permits fluid communication between the filter capsule 12 and the fluid stream.

Figure 7:
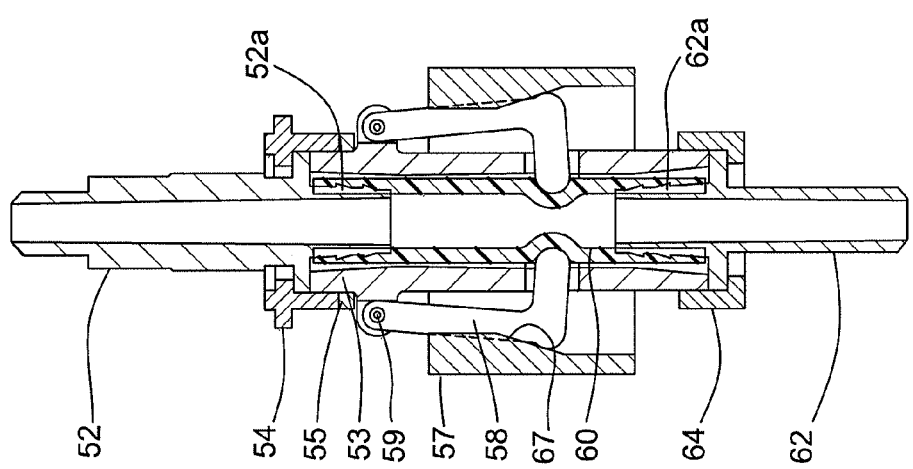
FIG. 7 is a cross-sectional view of one of the valve assemblies showing the valve in an intermediate position.

The wedge sleeve 57 has a main first hole 66 which is adapted to slidably receive the valve housing 53 and pinch arms 58. The wedge sleeve 57, which is adapted to slide relative to the valve fitting 52 and pinch arms 58, moves between (1) an upper or open position, (2) an intermediate, partially closed position, and (3) a closed or lower position as shown in FIGS. 6-8, respectively. The wedge sleeve 57 also has two spring holes 68 which receive the springs 56. The springs 56, which are disposed between the stationary spring plate 55 and the spring holes 68, normally bias the wedge sleeve downward to the closed or lower position shown in FIGS. 4 and 8.

As best shown in FIGS. 6-8, the main hole 66 has two tapered walls 67 which taper outwardly from the top to the bottom of the hole. It will be appreciated that vertical movement of the wedge sleeve 57 pivots the pinch arms between the open and closed positions. As shown in FIG. 6, when the wedge sleeve 57 is in the upper or open position, the pinch arms 58 engage the widest part of the hole 66 which permits the resilient sealing tube 60 and the internal fluid pressure inside the tube 60, if any, to bias the pinch arms 58 outwardly away from the tubing 60. As the wedge sleeve 57 moves downward relative to the valve 52, the tapered walls 67 engage the arms 58 and begin to push them inwardly toward the sealing tube 60 to the intermediate, partially closed position as shown in FIG. 7. When the wedge sleeve 57 reaches the closed position shown in FIG. 8, the narrowest portion of the tapered wall engages the pinch arms 58 and biases the arms 58 inward so that the arms 58 squeeze the sealing tube 60 closed, thereby preventing fluid from passing through the valves 16, 18.

In accordance with the invention, the valves 16, 18 and the carriage assembly 30 cooperate together to open and close the valves. It will be appreciated that the valves 16, 18 are generally disposed within the manifold housing. Referring to FIGS. 9-12, it will be seen that, as the carriage assembly 30 moves upwardly from the lower position toward the upper position, the valve actuator 38 may selectively engage and push the wedge sleeve 57 upwards to open the valves 16, 18. In accordance with one aspect of the invention, the valve actuator engages the wedge sleeve to open the valves 16, 18 only when a filter capsule 12 is disposed in the carriage assembly. If a filter capsule 12 is not loaded in the carriage assembly 30, the carriage assembly 30 moves upwards but the valve actuator 38 does not engage and push the wedge sleeve 57. To simplify the figures, the lifting arms 36 are not shown in FIGS. 9-12, but the lifting arms 36 are used to move the carriage assembly 30 between the lower and upper positions.

FIGS. 9-10 show the carriage assembly 30 without a filter capsule 12. Until a filter capsule is loaded into the carriage assembly, the valve actuator 38 remains in the inactive position shown in FIG. 9 because the actuator spring 47 biases the actuator 38 toward the channel opening 33 (i.e., toward the right in FIGS. 9-12). At least one of the actuator legs 46 are positioned under the recessed sections 57a on both sides of the wedge sleeve 57. When the carriage assembly 30 is raised to the upper position, the unactivated actuator leg 46 fits into the recessed section 57a and does not engage the wedge sleeve 57, as best shown in FIG. 10. The other leg 46 does not engage the wedge sleeve 57. Thus, the valves remain closed when a filter capsule 12 is not loaded into the carriage assembly 30.

FIGS. 11-12 show the carriage assembly 30 loaded with a filter capsule 12. When the filter capsule 12 is inserted into the channel 33, the capsule 12 engages the actuator pins 44 which pass through the slots 43 and project into the path of the filter capsule 12 in the channel. In response to the inward movement of the filter capsule (i.e., to the left in FIGS. 11-12), the filter capsule engages the actuator pins 44, overcomes the biasing force of the actuator springs 47, and pushes the pins 44 and the valve actuator 38 to the activated position (i.e., to the left in FIGS. 11-12). When the valve actuator 38 is in the activated position shown in FIGS. 11-12, the actuator legs 46 are positioned underneath the wedge sleeve 57. Thus, when the carriage assembly 30 is raised to the upper position, the actuator legs 46 engage the bottom of the wedge sleeve 57, as best shown in FIG. 12, and push the wedge sleeve 57 up toward the open position. In the open position, the tapered walls 67 disengage from the pinch arms 58, permitting the sealing tube 60 and internal fluid pressure, if any, to bias the pinch arms 58 to their open position. It will be appreciated that the valves 16, 18 are normally biased closed; and will not open unless a filter capsule 12 is present in the carriage assembly 30.

Figure 13:
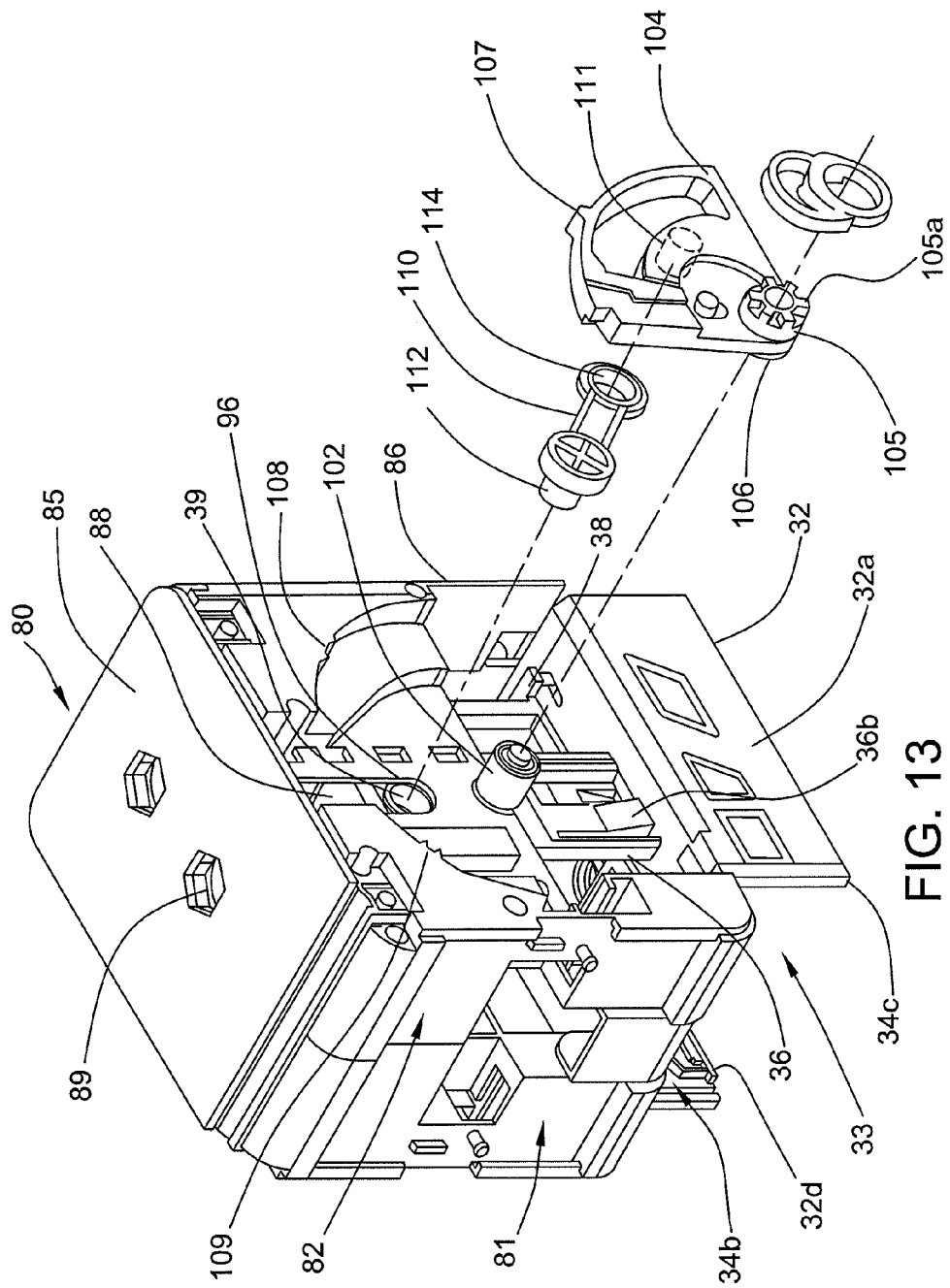
FIG. 13 is a partial exploded view of the manifold showing the lifting mechanism which moves the carriage assembly between the initial and active positions.
Figure 14:
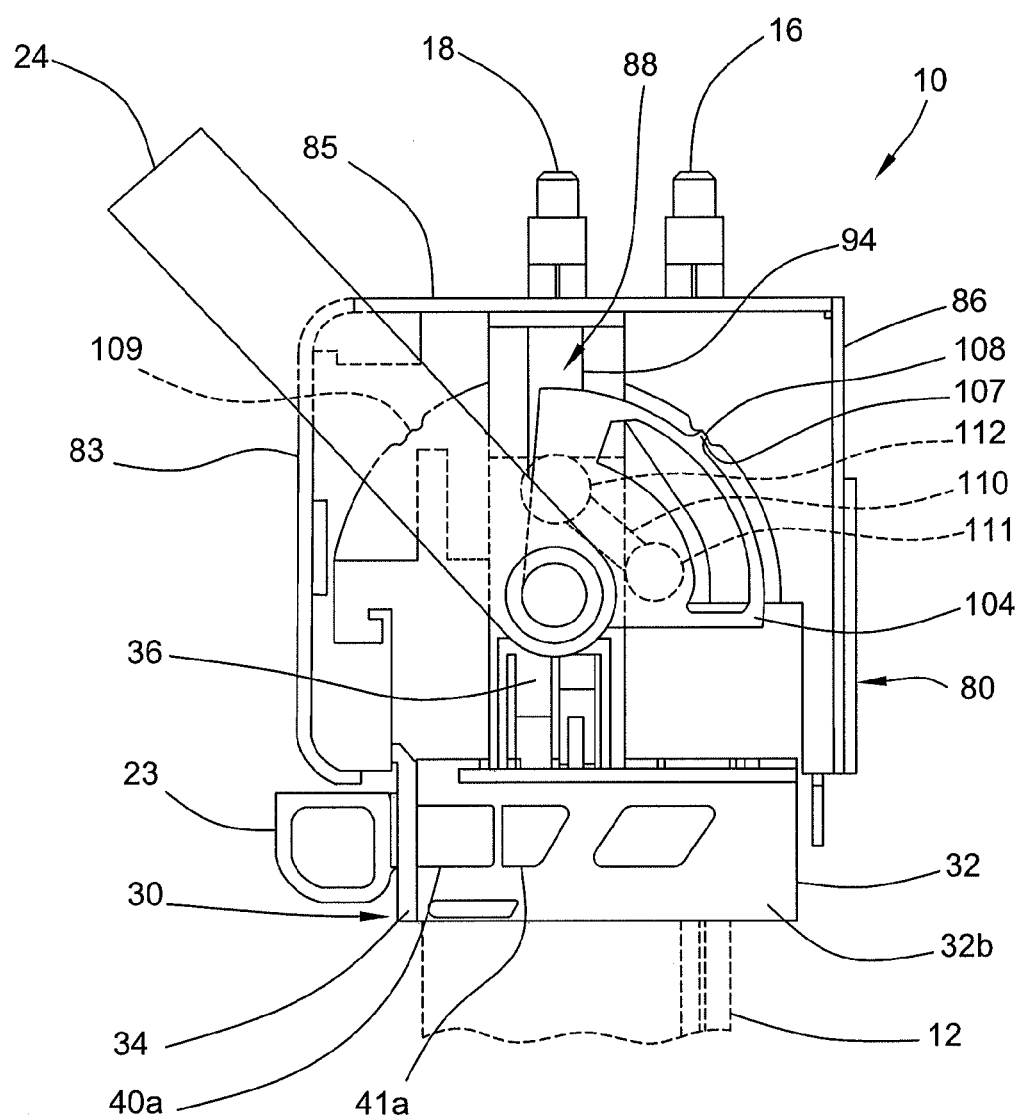
FIG. 14 is an elevational view of the manifold with portions of the exterior housing removed to show the capsule assembly, filter capsule (in phantom), and handle assembly in an initial position.
Figure 15:
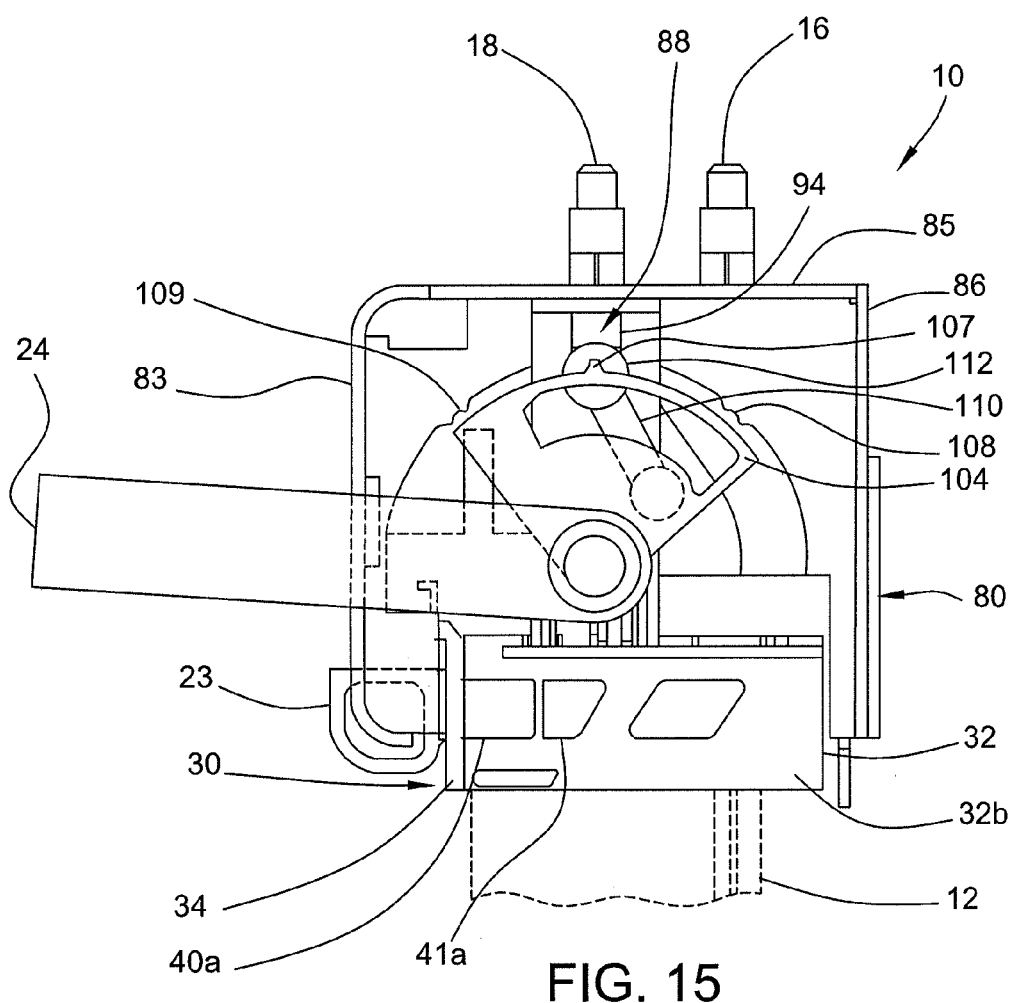
FIG. 15 is an elevational view of the manifold with portions of the exterior housing removed to show the capsule assembly, filter capsule (in phantom), and handle assembly in an intermediate position.
Figure 16:
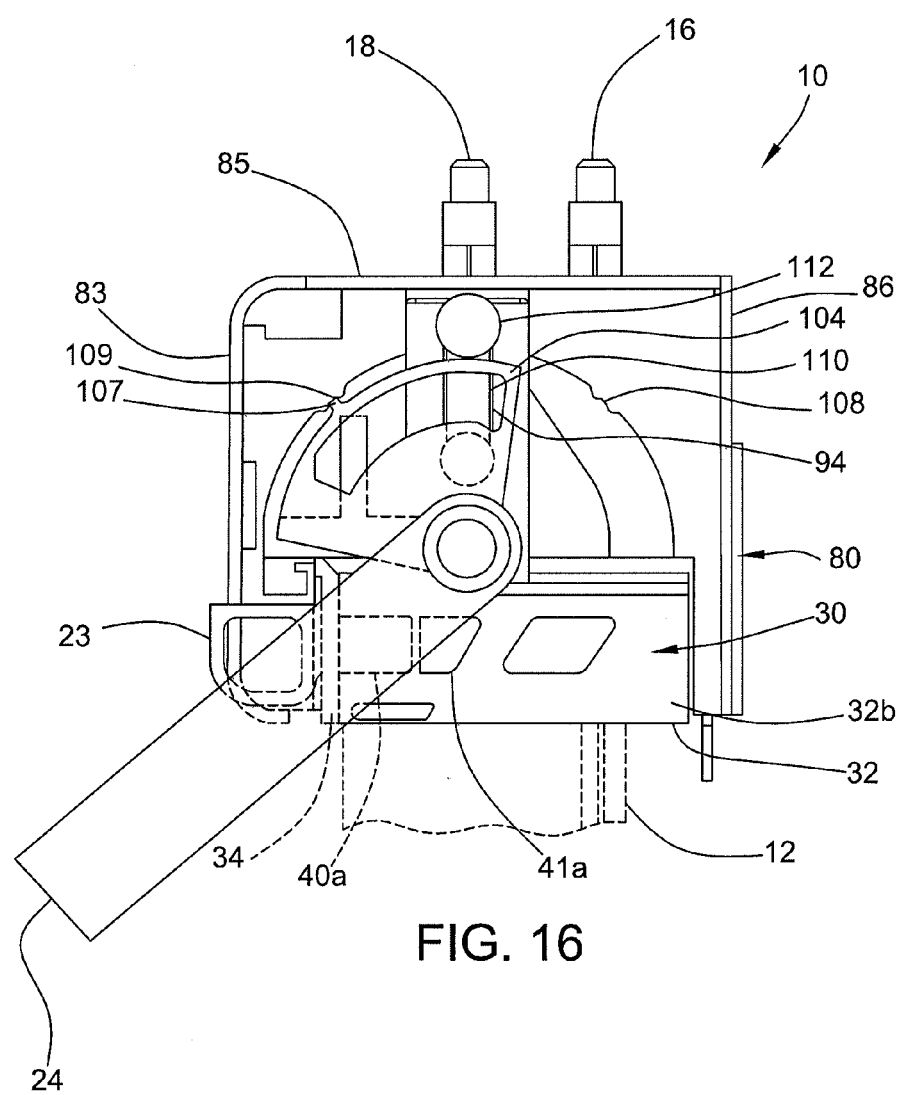
FIG. 16 is an elevational view of the manifold with portions of the exterior housing removed to show the capsule assembly, filter capsule (in phantom), and handle assembly in the final or loaded position.

The lifting assembly is shown in FIGS. 13-16. FIG. 13 shows the interior of the manifold housing 80 and an exploded view of the lifting assembly which is disposed inside the housing 80. To simplify the figure, the handle 24 is not shown in FIG. 13. FIGS. 14-16 show the movement of the lifting assembly between an initial or open position shown in FIG. 14, an intermediate position shown in FIG. 15, and a final or closed position shown in FIG. 16 as a user rotates the arm. As the user rotates the arm between the open and closed positions, the lifting assembly moves the carriage assembly 30 in a generally vertical direction between: (1) the lower or initial position shown in FIG. 14, (2) the intermediate position shown in FIG. 15, and (3) the upper or activated position shown in FIGS. 1 and 16. When the carriage assembly 30 is in the initial position, the filter capsule 12 may be releasably inserted into and out of the carriage assembly 30 as best shown in FIG. 2. The filter capsule 12 is shown in broken lines in FIGS. 14-16. When the handle 24 is rotated from the open position in FIG. 14, to the intermediate position in FIG. 15, and the closed position in FIG. 16, the handle 24 raises carriage assembly 30 and filter capsule 12 from the initial or lower position into the final or upper position.

Figure 17:
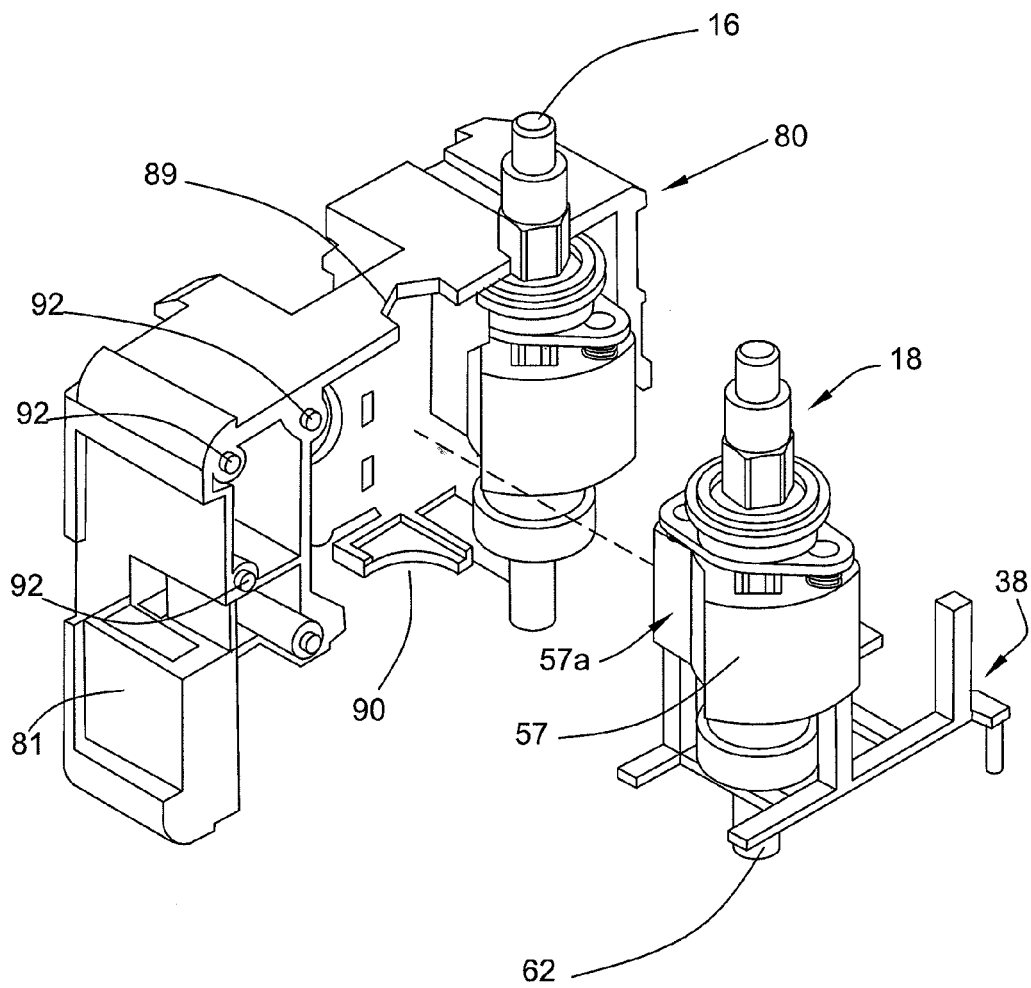
FIG. 17 is partial exploded view of a portion of the manifold housing and two valves.

Referring to FIG. 13, the carriage assembly 30 is disposed near the bottom of manifold 80. Left and right support structures 81, 82 are mounted on top of the carriage assembly. FIG. 17 illustrates one embodiment of the left support structure 81, two valves 16, 18 and the valve actuator 38. The support structures 81, 82 have two top openings 89 and bottom opening 90 adapted to receive and hold the valves 16, 18. The top openings 89 are preferably hex-shaped to prevent the valves 50 from rotating when a user attaches a fluid line to the valves 50 and installs a fitting. FIG. 17 schematically shows that the valve's capsule port 62 passes through the frame of the valve actuator 38. The two support structures 81, 82 may have a plurality of cooperating pins 92 which facilitate mating the two structures together. Once the manifold 80 is fully assembled, front and side plates 83, 84 (shown in FIG. 1) cover the interior of the manifold.

Referring to the lifting assembly shown in FIG. 13, the right support structure 82 has a projecting shaft 102 which is adapted to receive a crank link 104. The crank link 104 has a hole 106 which fits onto the shaft 102, and permits that crank link 104 to rotate between an open position shown in FIG. 14 and a closed position shown in FIG. 16. The crank link 104 also has a detent 107 which cooperates with locking nubs 108, 109 in the right support wall 82 in a detent fashion to hold the lifting assembly in the open and closed positions. The crank link 104 has a locking axle 105 with teeth 105a. The handle 24 has locking teeth which cooperate with teeth 105a to lock the crank link 104 and handle 24 together. Thus, the crank link 104 rotates about the shaft 102 in response to rotation of the handle 24 by the user.

One end of the slider link 110 has an axle 112 which is adapted to fit into the hole 39 of the lifting arm 36. The other end of the slider link 110 has a hole 114 which is adapted to receive a shaft 111 on the crank link 104. When the manifold is assembled, the slider link 110 is disposed between the right support structure 82 and the crank link 104, and the slider link 110 pivots relative to the arm hole 39 and shaft 111. The right support structure 82 has a slot 96 in the wall which permits the shaft 112 to move in a vertical direction.

To operate the lifting assembly, the handle 24 and carriage assembly 30 start in the initial open position shown in FIG. 14. In this open position, the filter capsule 12 may be inserted into and withdrawn from the carriage assembly 30. The detent 107 and locking nub 108 cooperate in a detent fashion to hold the crank link 104 in the open position. In FIG. 14, the slider link 110, which is pivotably anchored to the arm hole 39 and the crank hub 111, is normally positioned behind the crank link 104 and would not normally be seen in an elevational view. However, to illustrate the movement of the slider link 110, the slider link 110 is shown in broken lines. As the handle 24 is rotated toward the closed position, the crank link 104, which is rotationally locked to the handle 24 by the teeth 105a and 105b, rotates from the open position (i.e., FIG. 14) toward the closed position (i.e., FIG. 16). It will be appreciated that the pivotable connection between the slider link 110 and the crank's hub 111 translates the rotational movement of the handle 24/crank link 104 into vertical movement of the slider link's shaft 112 and the carriage assembly's lifting arms 36. Thus, the user may insert a filter capsule 12 into the carriage assembly and raise the filter capsule 12 into sealed engagement with the valves 16, 18 by rotating the handle 24. When the handle 24 is rotated to the closed position, the detent 107 engages the locking nub 109 in a detent fashion to hold the lifting assembly and filter capsule 12 in the upper, activated position. It will be appreciated that the presence of the filter capsule 12 in the activated position permits the valve to open and permit the fluid stream to access the inlet and outlet ports 20a, 20b in the filter capsule 12.

Once the filtration process is completed, the filter capsule 12 may be unloaded from the manifold system 10 by rotating the handle 24 from the closed position (FIG. 16) to the open position (FIG. 14). As the handle 24 is rotated toward the open position, the crank link 104, which is rotationally locked to the handle 24 by the teeth 105a and 105b, rotates from the closed position toward the open position. The detent 107 releases from the locking nub 109. The pivotable connection between the slider link 110 and the crank's hub 111 translates the clockwise rotational movement of the handle 24/crank link 104 (as shown in FIGS. 14-16) into downward vertical movement of the slider link's shaft 112 and the carriage assembly's lifting arms 36.

As the lifting arms 36 lower the carriage assembly, the valve actuator 38 and the actuator legs 46 are also lowered away from the wedge sleeve 57. In response to the downward movement of the actuator legs 46, the downward biasing force of the wedge spring 56 causes the wedge sleeve 57 to move downward. The downward movement of the wedge sleeve 57 causes the tapered wall 67 to engage the pinch arms 58 and force the pinch arms 58 to pivot from the open position (FIG. 6) to the closed position (FIG. 8). The force on the pinching arms 58 overcomes the resilient material of the tube 60 and any fluid pressure in the tube 60, thereby closing the valve 50 and preventing any fluid/gas stream from passing through the valve 50. It will be appreciated that the absence of the filter capsule 12 automatically results in the closure of the valve 50.

When the handle 24 is rotated to the open position, the detent 107 engages the locking nub 108 in a detent fashion to hold the lifting assembly in the lower, open position. Once the carriage assembly is disposed in the lower or initial position, the user may use the finger tab 23 to slide the filter capsule 12 out of the filter tray 34.

This disclosure is intended to be illustrative and not exhaustive. The disclosure will suggest many variations and alternatives to one of ordinary skill in the art. All these variations and alternatives are intended to be included within the scope of the present invention and appended claims. Those familiar with the art may recognized other equivalents to the embodiments described herein which are intended to be included within the scope of the present invention and appended claims.

The invention claimed is:

1. A filter manifold system comprising:
    a housing;
    a filter capsule, the filter capsule disposed in the housing;
    a first valve and a second valve, the first valve and the second valve each defining a valve passage and each comprising a plurality of movable pinch arms, the movable pinch arms movable over a range of travel between an open valve position in which the respective valve passage is in fluid communication with the filter capsule to permit a stream to pass through the valve passage and a closed valve position in which the respective valve passage is occluded to substantially prevent the stream from passing through the respective valve passage;
    a carriage assembly, the carriage assembly disposed in the housing, the carriage assembly comprising a filter tray, a lifting arm, and a valve actuator, the filter tray receiving and holding the filter capsule, the lifting arm operatively engaged with the filter tray for moving the carriage assembly between an initial loading position and a final position, and the valve actuator operatively attached to the filter tray for activating the first valve and the second valve, and wherein the valve actuator is operatively attached to the filter tray such that the valve actuator moves, in response to insertion of the filter capsule into the filter tray, from an inactive position in which the valve actuator is disengaged from the first valve and the second valve when the carriage assembly is in the final position to an activated position in which the valve actuator is engaged with the first valve and the second valve such that the respective movable pinch arms are disposed in the open valve position when the carriage assembly is in the final position;
    a lifting assembly, the lifting assembly comprising a handle, the handle rotatably mounted on the housing to move over a range of travel between a first lift position and a second lift position, and the handle being operatively connected to the lifting arm so that, when the handle is in the first lift position, the carriage assembly is disposed in the initial loading position, and, in response to movement of the handle from the first lift position to the second lift position, the carriage assembly moves from the initial loading position to the final position.

2. The filter manifold system as set forth in claim 1, wherein the valve actuator comprises a base, an actuator spring, and a pin, the actuator spring being configured to bias the valve actuator toward the inactive position, and the pin attached to the base such that the pin engages the filter capsule when the filter capsule is inserted into the filter tray to thereby move the valve actuator to the activated position.

3. The filter manifold system as set forth in claim 2, wherein the valve actuator comprises a plurality of upstanding legs attached to the base and disposed so that at least one of the legs engages the first valve and at least one other of the legs engages the second valve to cause the respective pinch arms to move to the open position when the valve actuator is in the activated position and the carriage assembly is in the final position, and so that the legs do not engage the first valve or the second valve and the first valve and the second valve remain in the closed position when the valve actuator is in the inactive position and the carriage assembly is in the final position.

4. The filter manifold system as set forth in claim 1, wherein each of the first valve and the second valve comprises a wedge sleeve, each wedge sleeve being movable over a range of travel between a first wedge position and a second wedge position, each wedge sleeve including a tapered wall slidably engaged with the pinch arms of the first valve and the second valve, respectively such that the tapered wall causes the pinch arms of the first valve and the second valve, respectively, to move to the closed position when the associated wedge sleeve is in the second wedge position and such that the tapered wall permits the pinch arms of the first valve and the second valve, respectively, to move to the open position when the associated wedge sleeve is in the first wedge position.

5. The filter manifold system as set forth in claim 4, wherein each of the first valve and the second valve comprises a spring operatively engaging the wedge sleeve of the first valve and the second valve, respectively, to bias the engaged wedge sleeve toward the second wedge position.

6. The filter manifold system as set forth in claim 5, wherein the valve actuator comprises a base, an actuator spring, and a pin, the actuator spring being configured to bias the valve actuator toward the inactive position, and the pin attached to the base such that the pin engages the filter capsule when the filter capsule is inserted into the filter tray to thereby move the valve actuator to the activated position.

7. The filter manifold system as set forth in claim 6, wherein the valve actuator comprises a plurality of upstanding legs attached to the base and disposed so that at least one of the legs engages the wedge sleeve of the first valve and at least one other of the legs engages the wedge valve of the second valve to move both of the wedge sleeves to the open position when the valve actuator is in the activated position and the carriage assembly is in the final position, and so that the legs do not engage the wedge sleeve of either the first valve or the second valve and the wedge sleeves remain in the closed position when the valve actuator is in the inactive position and the carriage assembly is in the final position.

8. The filter manifold system as set forth in claim 1, wherein each of the first valve and the second valve comprises a flexible sealing tube, each flexible sealing tube defining, at least in part, the valve passage of the first valve and the second valve, respectively, each flexible sealing tube disposed between the respective pinch arms of the first valve and the second valve so that the flexible sealing tube is open when the respective pinch arms are in the open valve position and the pinch arms compress the flexible sealing tube so that the flexible sealing tube is occluded when the respective pinch arms are in the closed position.

9. The filter manifold system as set forth in claim 1, wherein the lifting assembly comprises a crank link, the crank link having a first end and a second end, wherein the first end of the crank link is operatively attached to the handle and the second end is operatively attached to the carriage assembly so that rotation of the handle from the first lift position to the second lift position causes the second end of the crank link to move the carriage assembly from the initial loading position to the final position.

10. The filter manifold system as set forth in claim 9, wherein the housing defines a generally vertical slot disposed between the lifting arm and the crank link and configured to permit the lifting arm to operatively attach to the second end of the crank link so that rotational movement of the handle translates into vertical movement of the carriage assembly.

11. A filter manifold system comprising:
a housing;
a filter capsule, the filter capsule disposed in the housing;
a valve, the valve defining a valve passage and comprising a plurality of movable pinch arms, the movable pinch arms movable over a range of travel between an open valve position in which the valve passage is in fluid communication with the filter capsule to permit a stream to pass through the valve passage and a closed valve position in which the valve passage is occluded to substantially prevent the stream from passing through the valve passage;
a carriage assembly, the carriage assembly disposed in the housing, the carriage assembly comprising a filter tray, a lifting arm, and a valve actuator, the filter tray receiving and holding the filter capsule, the lifting arm operatively engaging the filter tray for moving the filter tray between an initial loading position and a final position, and the valve actuator operatively engaging the filter tray for activating the valve, and wherein the valve actuator is operatively attached to the filter tray such that the valve actuator moves, in response to insertion of the filter capsule into the filter tray, from an inactive position in which the valve actuator is disengaged from the valve when the carriage assembly is in the final position to an activated position in which the valve actuator is engaged with the valve such that the movable pinch arms are disposed in the open valve position when the carriage assembly is in the final position;
a lifting assembly, the lifting assembly comprising a handle, the handle rotatably mounted on the housing to move over a range of travel between a first lift position and a second lift position, and the handle being operatively connected to the lifting arm so that, when the handle is in the first lift position, the carriage assembly is disposed in the initial loading position, and, in response to movement of the handle from the first lift position to the second lift position, the carriage assembly moves from the initial loading position to the final position.

12. The filter manifold system as set forth in claim 11, wherein the valve actuator comprises a base, an actuator spring, and a pin, the actuator spring being configured to bias the valve actuator toward the inactive position, and the pin attached to the base such that the pin engages the filter capsule when the filter capsule is inserted into the filter tray to thereby move the valve actuator to the activated position.

13. The filter manifold system as set forth in claim 12, wherein the valve actuator comprises at least one upstanding leg attached to the base and disposed so that said at least one leg engages the valve to cause the pinch arms to move to the open position when the valve actuator is in the activated position and the carriage assembly is in the final position, and so that said at least one leg does not engage the valve and the valve remains in the closed position when the valve actuator is in the inactive position and the carriage assembly is in the final position.

14. The filter manifold system as set forth in claim 11, wherein the valve comprises a wedge sleeve, the wedge sleeve being movable over a range of travel between a first wedge position and a second wedge position, the wedge sleeve including a tapered wall slidably engaged with the pinch arms such that the tapered wall causes the pinch arms to move to the closed position when the wedge sleeve is in the second wedge position and such that the tapered wall permits the pinch arms to move to the open position when the wedge sleeve is in the first wedge position.

15. The filter manifold system as set forth in claim 14, wherein the valve comprises a spring operatively engaging the wedge sleeve to bias the wedge sleeve toward the second wedge position.

16. The filter manifold system as set forth in claim 15, wherein the valve actuator comprises a base, an actuator spring, and a pin, the actuator spring being configured to bias the valve actuator toward the inactive position, and the pin attached to the base such that the pin engages the filter capsule when the filter capsule is inserted into the filter tray to thereby move the valve actuator to the activated position.

17. The filter manifold system as set forth in claim 16, wherein the valve actuator comprises a leg, the leg attached to the base so that the leg engages the wedge sleeve to move the wedge sleeve to the open position when the valve actuator is in the activated position and the carriage assembly is in the final position, and so that the leg does not engage the wedge sleeve and the wedge sleeve remains in the closed position when the valve actuator is in the inactive position and the carriage assembly is in the final position.

18. The filter manifold system as set forth in claim 11, wherein the valve comprises a flexible sealing tube, the flexible sealing tube disposed between the pinch arms so that the flexible sealing tube is open when the pinch arms are in the open valve position and the pinch arms compress the flexible sealing tube so that the flexible sealing tube is occluded when the pinch arms are in the closed position.

19. The filter manifold system as set forth in claim 11, wherein the lifting assembly comprises a crank link, the crank link having a first end and a second end, wherein the first end of the crank link is operatively attached to the handle and the second end is operatively attached to the carriage assembly so that rotation of the handle from the first lift position to the second lift position causes the second end of the crank link to move the carriage assembly from the initial loading position to the final position.

20. The filter manifold system as set forth in claim 19, wherein the housing defines a generally vertical slot disposed between the lifting arm and the crank link and configured to permit the lifting arm to operatively attach to the second end of the crank link so that rotational movement of the handle translates into vertical movement of the carriage assembly.

21. A filter manifold for receiving and holding a filter capsule, the manifold comprising:
a housing;
a valve, the valve defining a valve passage and comprising a plurality of movable pinch arms, the movable pinch arms movable over a range of travel between an open valve position in which the valve passage is open to permit a stream to pass through the valve passage and a closed valve position in which the valve passage is occluded to substantially prevent the stream from passing through the valve passage;
a carriage assembly, the carriage assembly disposed in the housing, the carriage assembly comprising a filter tray, a lifting arm, and a valve actuator, the filter tray for receiving and holding the filter capsule, the lifting arm operatively engaging the filter tray for moving the filter tray between an initial loading position and a final position, and the valve actuator operatively engaging the filter tray for activating the valve, and wherein the valve actuator is operatively attached to the filter tray such that the valve actuator moves, in response to insertion of the filter capsule into the filter tray, from an inactive position in which the valve actuator is disengaged from the valve when the carriage assembly is in the final position to an activated position in which the valve actuator is engaged with the valve such that the movable pinch arms are disposed in the open valve position when the carriage assembly is in the final position;
a lifting assembly, the lifting assembly comprising a handle, the handle rotatably mounted on the housing to move over a range of travel between a first lift position and a second lift position, and the handle being operatively connected to the lifting arm so that, when the handle is in the first lift position, the carriage assembly is disposed in the initial loading position, and, in response to movement of the handle from the first lift position to the second lift position, the carriage assembly moves from the initial loading position to the final position.

22. The filter manifold as set forth in claim 21, wherein the valve actuator comprises a base, an actuator spring, and a pin, the actuator spring being configured to bias the valve actuator toward the inactive position, and the pin attached to the base such that the pin engages the filter capsule when the filter capsule is inserted into the filter tray to thereby move the valve actuator to the activated position.

23. The filter manifold as set forth in claim 22, wherein the valve actuator comprises at least one upstanding leg attached to the base and disposed so that said at least one leg engages the valve to cause the pinch arms to move to the open position when the valve actuator is in the activated position and the carriage assembly is in the final position, and so that said at least one leg does not engage the valve and the valve remains in the closed position when the valve actuator is in the inactive position and the carriage assembly is in the final position.

24. The filter manifold as set forth in claim 21, wherein the valve comprises a wedge sleeve, the wedge sleeve being movable over a range of travel between a first wedge position and a second wedge position, the wedge sleeve including a tapered wall slidably engaged with the pinch arms such that the tapered wall causes the pinch arms to move to the closed position when the wedge sleeve is in the second wedge position and such that the tapered wall permits the pinch arms to move to the open position when the wedge sleeve is in the first wedge position.

25. The filter manifold as set forth in claim 24, wherein the valve comprises a spring operatively engaging the wedge sleeve to bias the wedge sleeve toward the second wedge position.

26. The filter manifold as set forth in claim 25, wherein the valve actuator comprises a base, an actuator spring, and a pin, the actuator spring being configured to bias the valve actuator toward the inactive position, and the pin attached to the base such that the pin engages the filter capsule when the filter capsule is inserted into the filter tray to thereby move the valve actuator to the activated position.

27. The filter manifold as set forth in claim 26, wherein the valve actuator comprises a leg, the leg attached to the base so that the leg engages the wedge sleeve to move the wedge sleeve to the open position when the valve actuator is in the activated position and the carriage assembly is in the final position, and so that the leg does not engage the wedge sleeve and the wedge sleeve remains in the closed position when the valve actuator is in the inactive position and the carriage assembly is in the final position.

28. The filter manifold as set forth in claim 21, wherein the valve comprises a flexible sealing tube, the flexible sealing tube disposed between the pinch arms so that the flexible sealing tube is open when the pinch arms are in the open valve position and the pinch arms compress the flexible sealing tube so that the flexible sealing tube is occluded when the pinch arms are in the closed position.

29. The filter manifold as set forth in claim 21, wherein the lifting assembly comprises a crank link, the crank link having a first end and a second end, wherein the first end of the crank link is operatively attached to the handle and the second end is operatively attached to the carriage assembly so that rotation of the handle from the first lift position to the second lift position causes the second end of the crank link to move the carriage assembly from the initial loading position to the final position.

30. The filter manifold as set forth in claim 29, wherein the housing defines a generally vertical slot disposed between the lifting arm and the crank link and configured to permit the lifting arm to operatively attach to the second end of the crank link so that rotational movement of the handle translates into vertical movement of the carriage assembly.

* * * * *